No. 721,485. PATENTED FEB. 24, 1903.
W. P. WEST & A. J. GLOR.
MANURE CARRIER.
APPLICATION FILED SEPT. 22, 1902.
NO MODEL.
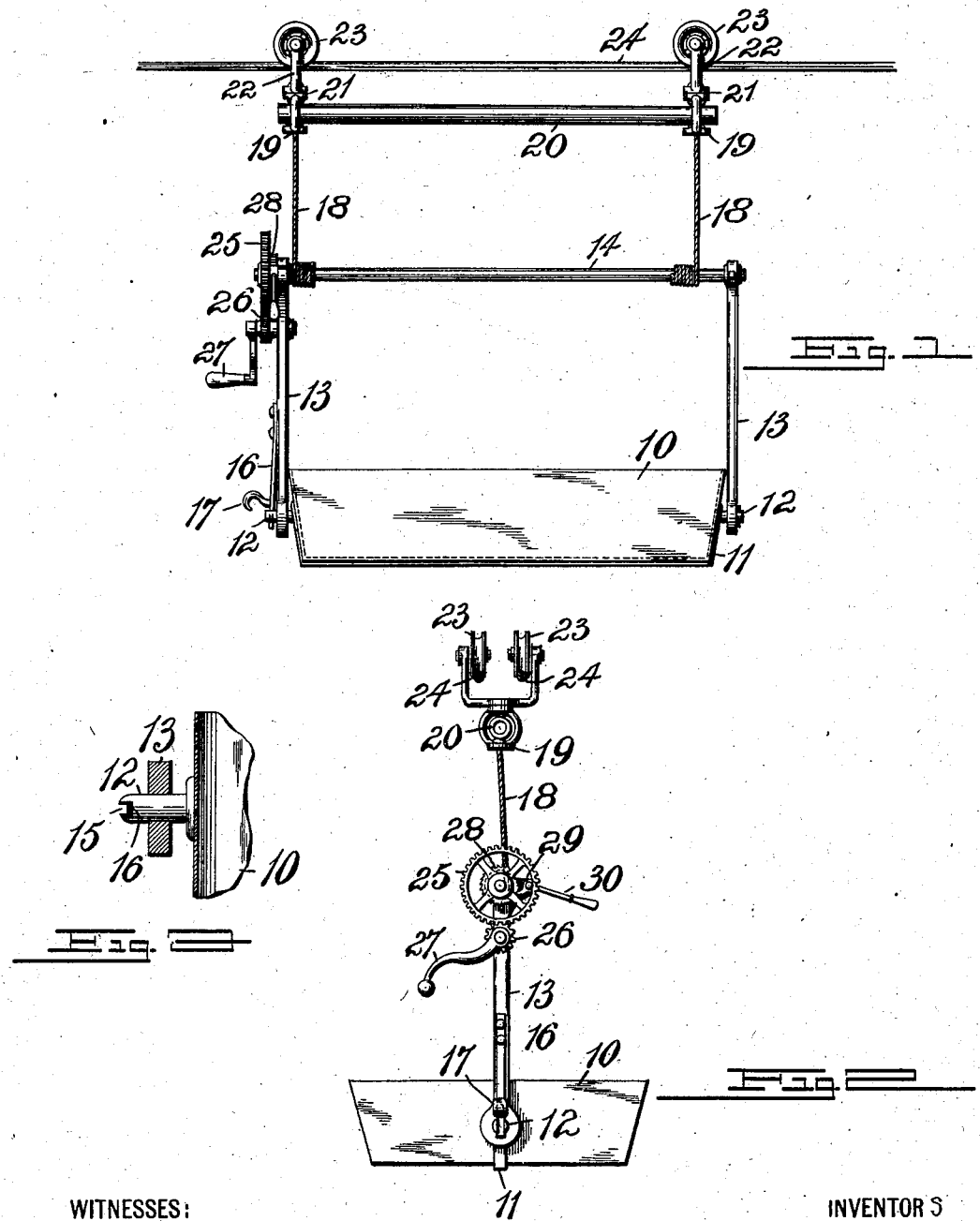
WITNESSES:
INVENTORS
William P. West, and
Alvin J. Glor,
BY
ATTORNEY

UNITED STATES PATENT OFFICE.

WILLIAM P. WEST AND ALVIN J. GLOR, OF VARYSBURG, NEW YORK.

MANURE-CARRIER.

SPECIFICATION forming part of Letters Patent No. 721,485, dated February 24, 1903.

Application filed September 22, 1902. Serial No. 124,289. (No model.)

*To all whom it may concern:*

Be it known that we, WILLIAM P. WEST and ALVIN J. GLOR, of Varysburg, Wyoming county, New York, have invented certain new and useful Improvements in Manure-Carriers, of which the following is a full, clear, and exact description.

Our invention relates to improvements in carriers; and the primary object of the invention is to produce an apparatus of simple construction which is easy to operate and by which manure can be conveyed from the stable or other point to the place where it is to be deposited and then easily dumped. Obviously the carrier can be used for handling many other materials without affecting the principle of the invention. The carrier embodying our invention, however, is adapted to be conveniently placed in position for use in a stable or barn, and it is constructed so that it will readily follow the curves of the track, so that it can be conveniently lowered to be filled and raised to be transported, and so that by a very simple movement the pan carrying the load can be made to dump on either side as desired.

With these ends in view our invention consists of certain features of construction and combinations of parts, which will be hereinafter described and claimed.

Reference is to be had to the accompanying drawings, forming part of this specification, in which similar figures of reference refer to similar parts throughout the several views.

Figure 1 is a side elevation of our improved carrier. Fig. 2 is a front end view of the same, the track being shown in section; and Fig. 3 is a detail sectional plan showing the catch by means of which the pan is held rigid or permitted to tip.

The material to be conveyed is held in a pan 10, which can be of any approved construction, but which is preferably of a generally rectangular shape. It is also preferably provided with a strengthening-band 11, extending from the ends beneath the bottom; but obviously the band can be made in any desired way. The pan has at the ends trunnions 12, on which it turns, and these trunnions should be placed a little below the center, so that when the pan is released it can be easily tipped and dumped. These trunnions 12 turn in the arms 13, which support the pan and which, in connection with the shaft 14, form a hanger for the pan. The shaft 14 is journaled in the upper ends of the arms 13. One of the trunnions 12 is notched at the end, as shown at 15 in Fig. 3, to receive the flat spring 16, which at one end is secured to the adjacent arm 13 and which is provided with a hook 17 or other form of handle. It will be seen that when the spring 16 is in the notch 15 the pan 10 is held against turning on its trunnions 12; but when the spring-catch is pulled from the notch 15 the pan can be easily tipped and dumped. If it is desired to dump the pan on one side or the other, it can be loaded a little heavier on such side and then will tip automatically when released. The form of catch shown is simple and efficient; but other means can be substituted for holding the pan in its horizontal position.

The pan and its hanger are supported from a suitable track by means of cables 18, which may be ordinary ropes, either wire or other material, these ropes being at their lower ends secured to the shaft and at their upper ends suspended from the stirrups 19, which form a part of the overhead trolley and which are connected and spaced by the rod 20, such rod being preferably an ordinary gas-pipe.

The stirrups 19 connect by swivel-joints 21 with the yokes 22, the latter being of a general U shape and having at their upper ends grooved pulleys or wheels 23, which run on the parallel track-rails 24. The track-rails 24 can be of any usual type and can be supported in any customary way. The object of the swivel-joints 21 is to enable the trolley to easily conform to any curvatures of the track.

The raising and lowering of the carrier is effected by the following means: On the shaft 14 is a gear 25, meshing with the pinion 26, which is journaled on one of the arms 13 and turned by a suitable handle 17. The shaft 14 has also a ratchet-wheel 28, which is engaged by a pawl 29, and the latter has a handle 30, by which it can be released. By releasing the pawl 29 the weight of the pan 10 will cause it to drop, the cables 18 being meanwhile unwound from the shaft 14, and when the pan is filled and is to be raised the operator turns the handle 27, which turns the shaft 14, winds up the cables 18, and so lifts the pan.

It will be readily seen that the track 24 can be made to extend to any desired point and that by means of the simple apparatus shown a comparatively large load can be readily transported and conveniently dumped. It will also be seen that by such means the operation can be rendered much neater than by the usual more primitive methods employed.

Having thus described our invention, what we claim as new, and desire to secure by Letters Patent, is—

1. An apparatus of the kind described, comprising an overhead trolley, a hanger consisting of depending arms, and a connecting-shaft journaled in the arms, cables connecting the shaft with the trolley, a pan journaled in the arms of the hanger, a fastening device to hold the pan from tilting, and means for winding the cables on the hanger-shaft.

2. An apparatus of the kind described, comprising a trolley, a hanger suspended therefrom, a pan having on opposite sides trunnions which are journaled in the hanger, and means as the spring on the hanger, and a notch in one of the trunnions to hold the pan from tilting.

3. In an apparatus of the kind described, the combination of a hanger comprising a shaft and depending arms journaled thereon, cables connecting the shaft with a trolley, a crank mechanism for turning the shaft, a pawl and ratchet to prevent the shaft from unwinding, a pan supported in the hanger, and a fastening device controlling the tilting of the pan.

4. An apparatus of the kind described, comprising an overhead trolley having wheels spaced apart, yokes connecting opposite wheels, and a connecting-rod swivelly supported on the yokes and forming a connection between them, a hanger comprising a shaft having depending arms, a cable attached to the shaft and supported on the trolley, a gear mechanism for turning the shaft and winding up the cables, and a tilting-pin carried by the arms of the hanger.

In testimony whereof we have hereunto set our hands in the presence of two subscribing witnesses.

WILLIAM P. WEST.
ALVIN J. GLOR.

Witnesses:
ROBERT M. GLOR,
JOHN M. BRYSON.